(12) United States Patent
Wang et al.

(10) Patent No.: US 12,436,085 B2
(45) Date of Patent: Oct. 7, 2025

(54) DEVICE AND METHOD FOR CALIBRATING PARTICLE IMAGE VELOCIMETRY (PIV) IMAGE BASED ON LASER LINEAR ARRAYS

(71) Applicant: NINGBO INSTITUTE OF TECHNOLOGY, BEIHANG UNIVERSITY, Ningbo (CN)

(72) Inventors: Shaofei Wang, Zhejiang (CN); Chong Pan, Ningbo (CN); Jinjun Wang, Ningbo (CN)

(73) Assignee: NINGBO INSTITUTE OF TECHNOLOGY, BEIHANG UNIVERSITY, Ningbo (CN)

( * ) Notice: Subject to any disclaimer, the term of this patent is extended or adjusted under 35 U.S.C. 154(b) by 108 days.

(21) Appl. No.: 18/684,683

(22) PCT Filed: Aug. 25, 2021

(86) PCT No.: PCT/CN2021/114416
§ 371 (c)(1),
(2) Date: Feb. 18, 2024

(87) PCT Pub. No.: WO2023/023961
PCT Pub. Date: Mar. 2, 2023

(65) Prior Publication Data
US 2024/0311977 A1 Sep. 19, 2024

(51) Int. Cl.
*G01N 15/1433* (2024.01)
*G01N 15/00* (2006.01)
*G06T 5/60* (2024.01)

(52) U.S. Cl.
CPC ......... *G01N 15/1433* (2024.01); *G01N 15/00* (2013.01); *G06T 5/60* (2024.01);
(Continued)

(58) Field of Classification Search
CPC ............... G01N 15/1433; G01N 15/00; G01N 2015/0003; G01N 2015/0046;
(Continued)

(56) References Cited

U.S. PATENT DOCUMENTS

2018/0330520 A1* 11/2018 Brücker .................... G06T 7/80

FOREIGN PATENT DOCUMENTS

| CN | 105783770 A | * | 7/2016 | ......... G01B 11/2433 |
| CN | 107657649 A | * | 2/2018 | ............. G06T 11/20 |

(Continued)

*Primary Examiner* — John R Schnurr
(74) *Attorney, Agent, or Firm* — Tutunjian & Bitetto, P.C.

(57) ABSTRACT

The present disclosure provides a device and method for calibrating a particle image velocimetry (PIV) image based on laser linear arrays, and relates to the technical field of laser velocity measurement and image restoration. The present disclosure can solve the problem of image distortion caused by a shock wave of a model in a hypersonic wind tunnel, thereby realizing distortion capture and correction. The device includes a laser emission component configured to emit equidistant laser linear arrays; an optical component configured to perform light splitting on laser rays to form a laser grating in a test observation region; a camera configured to acquire a distorted laser grating image when a working condition of a wind tunnel test section model is adjusted to a working condition of a PIV test; and a background processor configured to calibrate and restore the distorted laser grating image with a neural network-based distortion-restoring calibration algorithm.

10 Claims, 5 Drawing Sheets

(52) U.S. Cl.
CPC ............... *G01N 2015/0003* (2013.01); *G06T 2207/20084* (2013.01)

(58) Field of Classification Search
CPC .............. G01N 2015/1027; G06T 5/60; G06T 2207/20084; G01M 9/02; G01M 9/08; G01P 5/20; G01P 21/02
See application file for complete search history.

(56) References Cited

FOREIGN PATENT DOCUMENTS

| | | | | | |
|---|---|---|---|---|---|
| CN | 109085385 | A | * | 12/2018 | ............ G01P 21/025 |
| CN | 112577697 | A | * | 3/2021 | .............. G01M 9/04 |
| CN | 113092056 | A | * | 7/2021 | .............. G01M 9/06 |
| DE | 102014011480 | B3 | * | 11/2015 | .............. G01P 21/02 |
| KR | 20220109203 | A | * | 8/2022 | ........... H04N 13/271 |

* cited by examiner

```
Acquire a distorted laser grating image when a
working condition of a wind tunnel test section      201
model is adjusted to a working condition of a PIV
                      test
```

```
Calibrate and restore the distorted laser grating
image with a neural network-based distortion-        202
restoring calibration algorithm to obtain a
       reconstructed laser grating image
```

DEVICE AND METHOD FOR CALIBRATING PARTICLE IMAGE VELOCIMETRY (PIV) IMAGE BASED ON LASER LINEAR ARRAYS

TECHNICAL FIELD

The present disclosure relates to the technical field of laser velocity measurement and image restoration, and in particular to a device and method for calibrating a particle image velocimetry (PIV) image based on laser linear arrays.

BACKGROUND

Particle image velocimetry (PIV) is a non-intrusive optical measurement technique in a flow velocity field. It measures a velocity of movement in the flow velocity field by tracking cross-frame displacements of particle micells on two particle images captured by a laser camera system, and has been widely applied to wind tunnel tests.

Before a particle trajectory image is recorded, spatial resolutions of the image are to be calibrated. Conventionally, a target of black and white checkerboard paper is placed in a tested region. Upon acquisition of a camera, a distorted mathematical model is solved with recorded corner coordinates, and spatial resolutions at various positions of the image are obtained. However, problems occur in case of a hypersonic wind tunnels. Specifically, due to a high wind velocity, a shock wave is generated locally when the target is placed in the tested region. Consequently, optical diffraction is caused locally in the tested region, the recorded particle trajectory image is distorted, and accurate spatial resolutions at various positions of the image cannot be obtained.

In case of a windless condition, the target in the tested region causes neither the shock wave nor the distortion, such that the spatial resolutions cannot be obtained. In case of a windy condition, the target generates the shock wave per se to cause complex distortion, such that the accurate spatial resolutions cannot be obtained. Obviously, the above methods cannot obtain a distorted image caused by the shock wave in true model test, and cannot obtain the spatial resolutions various positions of the image.

SUMMARY

An objective of the present disclosure is to provide a device and method for calibrating a PIV image based on laser linear arrays, to accurately obtain a distorted image caused by a shock wave in true model test.

To achieve the above objective, the present disclosure provides the following technical solutions.

A device for calibrating a PIV image based on laser linear arrays includes:
a laser emission component configured to emit equidistant laser linear arrays to form a laser linear array light path;
an optical component configured to perform light splitting on laser rays in the laser linear array light path to form a laser grating in a test observation region;
a camera configured to acquire a distorted laser grating image when a working condition of a wind tunnel test section model is adjusted to a working condition of a PIV test, the test observation region being located above the wind tunnel test section model; and
a background processor configured to calibrate and restore the distorted laser grating image with a neural network-based distortion-restoring calibration algorithm to obtain a reconstructed laser grating image.

Optionally, the laser emission component includes a fixed frame and a plurality of laser pointers;
the plurality of laser pointers are parallel arranged on the fixed frame, and a distance between any two adjacent ones of the laser pointers is the same; and
in operation, a mounting angle of the laser emission component and a distance between two adjacent ones of the laser pointers are adjusted, such that all laser rays in the laser linear arrays are parallel and coplanar.

Optionally, the optical component includes a semi-transparent and semi-reflective mirror and a total-reflection mirror sequentially arranged on the laser linear array light path;
in operation, a mounting angle of the semi-transparent and semi-reflective mirror is adjusted, such that after the laser rays pass through the semi-transparent and semi-reflective mirror, one part of the laser rays are transmitted, and the other part of the laser rays are reflected to form first reflected laser rays, and the first reflected laser rays are irradiated onto the test observation region;
a mounting angle of the total-reflection mirror is adjusted, such that transmitted laser rays are totally reflected by the total-reflection mirror to form second reflected laser rays, and the second reflected laser rays are irradiated onto the test observation region; and
the first reflected laser rays and the second reflected laser rays are crossed in the test observation region to form a staggered laser grating.

Optionally, after a hypersonic wind tunnel is opened, the camera is configured to acquire the distorted laser grating image when the working condition of the wind tunnel test section model is adjusted to the working condition of the PIV test; and
before the hypersonic wind tunnel is opened, the camera is configured to acquire a non-distorted laser grating image.

Optionally, the background processor specifically includes:
a distorted two-dimensional (2D) corner coordinate information extraction module configured to extract 2D corner coordinate information of the laser grating on the distorted laser grating image with a corner detection algorithm;
a non-distorted 2D corner coordinate information determination module configured to determine non-distorted 2D corner coordinate information based on a neutral network model and the 2D corner coordinate information of the laser grating on the distorted laser grating image; and
a reconstruction module configured to obtain the reconstructed laser grating image based on the non-distorted 2D corner coordinate information.

Optionally, the neutral network model is a three-layer neutral network model; a mean square error (MSE) function serves as a loss function of the neutral network model; the neutral network model includes two hidden layers; and a rectified linear unit (ReLU) activation layer is added after each neuron; and
the 2D corner coordinate information of the laser grating on the distorted laser grating image serves as an input of the neutral network model, and the corresponding non-distorted 2D corner coordinate information serves as an output of the neutral network model.

A method for calibrating a PIV image based on laser linear arrays includes:
acquiring the distorted laser grating image when the working condition of the wind tunnel test section model is adjusted to the working condition of the PIV test, the laser grating being a grating formed in the test observation region after the light splitting is performed on the laser rays in the laser linear array light path; and calibrating and restoring the distorted laser grating image with the neural network-based distortion-restoring calibration algorithm to obtain the reconstructed laser grating image.

Optionally, the method for calibrating a PIV image based on laser linear arrays further includes:

providing the laser emission component, where the laser emission component includes a fixed frame and a plurality of laser pointers; the plurality of laser pointers are parallel arranged on the fixed frame, and a distance between any two adjacent ones of the laser pointers is the same; and in operation, a mounting angle of the laser emission component and a distance between two adjacent ones of the laser pointers are adjusted, such that all laser rays in the laser linear arrays are parallel and coplanar.

Optionally, the method for calibrating a PIV image based on laser linear arrays further includes:

sequentially providing a semi-transparent and semi-reflective mirror and a total-reflection mirror on the laser linear array light path, where in operation, a mounting angle of the semi-transparent and semi-reflective mirror is adjusted, such that after the laser rays pass through the semi-transparent and semi-reflective mirror, one part of the laser rays are transmitted, and the other part of the laser rays are reflected to form first reflected laser rays, and the first reflected laser rays are irradiated onto the test observation region;

a mounting angle of the total-reflection mirror is adjusted, such that transmitted laser rays are totally reflected by the total-reflection mirror to form second reflected laser rays, and the second reflected laser rays are irradiated onto the test observation region; and the first reflected laser rays and the second reflected laser rays are crossed in the test observation region to form a staggered laser grating.

Optionally, the calibrating and restoring the distorted laser grating image with the neural network-based distortion-restoring calibration algorithm to obtain the reconstructed laser grating image specifically includes:

extracting 2D corner coordinate information of the laser grating on the distorted laser grating image with a corner detection algorithm;

determining non-distorted 2D corner coordinate information based on a neutral network model and the 2D corner coordinate information of the laser grating on the distorted laser grating image; and obtaining the reconstructed laser grating image based on the non-distorted 2D corner coordinate information.

According to specific embodiments provided in the present disclosure, the present disclosure has the following technical effects:

According to the device and method for calibrating a PIV image based on laser linear arrays provided by the present disclosure, the present disclosure acquires a laser grating instead of a conventional physical object, and realizes calibration on the true model test under a shock-wave condition, without interference to a true flow field. Upon this, the present disclosure performs calibration and distortion restoration on the distorted laser grating image with the neural network-based distortion-restoring calibration algorithm, and accurately obtains a distorted image caused by a shock wave in the true model test, thereby obtaining spatial resolutions at various positions of the image.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

FIG. 5 illustrates a laser grating image before and after distortion recorded in an implementation of the present disclosure, where

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

An objective of the present disclosure is to provide a novel device for calibrating a PIV image without a physical target, to replace a conventional physical target. The present disclosure realizes calibration on a true model test under a shock-wave condition, without interference on a true flow field. Upon this, the present disclosure performs calibration and distortion restoration on a distorted laser grating image with a neural network algorithm.

Another objective of the present disclosure is to provide a software-hardware system for calibrating a 2D PIV image, to realize high-accuracy image calibration without contact and interference.

In order to make the above objective, features and advantages of the present disclosure clearer and more comprehensible, the present disclosure will be further described in detail below in combination with accompanying drawings and particular implementation modes.

Embodiment 1

Figures 1, 2:
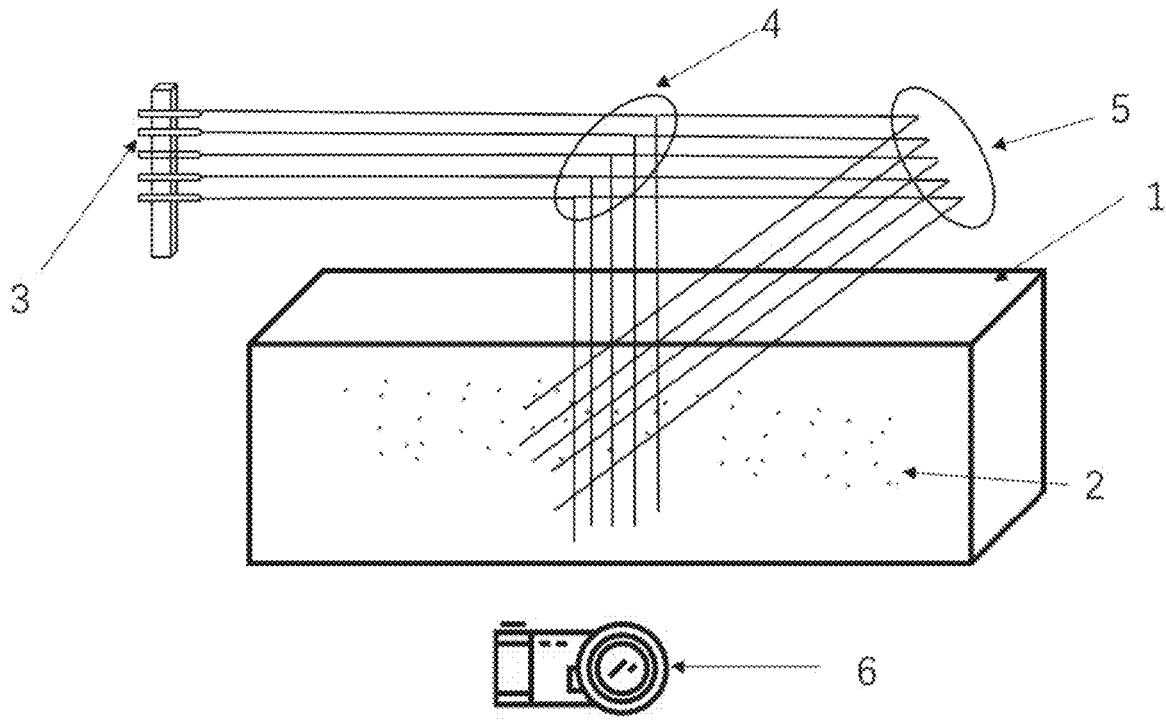
FIG. 1 is a schematic structural view of a device for calibrating a PIV image based on laser linear arrays according to the present disclosure.
FIG. 2 is a flow chart of a method for calibrating a PIV image based on laser linear arrays according to the present disclosure.

The embodiment provides a device for calibrating a PIV image based on laser linear arrays. The device is mainly intended to form a laser grating in a test observation region through a laser linear array and an optical component to serve as a non-physical target. The device is applied to a PIV test of a high-Mach-number wind tunnel model. As shown in FIG. 1, the device includes: a laser emission component, an optical component, a camera, and a background processor.

The laser emission component 3 is configured to emit equidistant laser linear arrays to form a laser linear array light path.

The optical component is configured to perform light splitting on laser rays in the laser linear array light path to form a laser grating in a test observation region.

The camera 6 is configured to acquire a distorted laser grating image when a working condition of a wind tunnel test section model 1 is adjusted to a working condition of a PIV test. The test observation region is located above the wind tunnel test section model 1.

The background processor is configured to calibrate and restore the distorted laser grating image with a neural network algorithm to obtain a reconstructed laser grating image.

As a preferred implementation, the laser linear array 3 in the embodiment includes a fixed frame and a plurality of high-power laser pointers on the fixed frame.

The plurality of laser pointers are parallel arranged on the fixed frame. A distance between any two adjacent ones of the laser pointers is the same.

In operation, a mounting angle of the laser emission component and a distance between two adjacent ones of the laser pointers are adjusted, such that all laser rays in the laser linear arrays are parallel and coplanar.

Further, ten sets of continuous helium-neon laser pointers are used in the embodiment. The laser pointers have a power of 1 W and generate green light with a wavelength of 633 nm.

As a preferred implementation, the optical component in the embodiment includes a semi-transparent and semi-reflective mirror 4 and a total-reflection mirror 5 arranged on the laser linear array light path. The semi-transparent and semi-reflective mirror 4 and the total-reflection mirror 5 are located above the wind tunnel test section model 1.

In operation, a mounting angle of the semi-transparent and semi-reflective mirror 4 is adjusted, such that after the laser rays pass through the semi-transparent and semi-reflective mirror 4, one part of the laser rays are transmitted, and the other part of the laser rays are reflected to form first reflected laser rays. The first reflected laser rays are irradiated onto the test observation region.

A mounting angle of the total-reflection mirror 5 is adjusted, such that transmitted laser rays are totally reflected by the total-reflection mirror 5 to form second reflected laser rays. The second reflected laser rays are irradiated onto the test observation region.

The first reflected laser rays and the second reflected laser rays are crossed in the test observation region to form a staggered laser grating.

Further, the semi-transparent and semi-reflective mirror 4 and the total-reflection mirror 5 are made of a nickel plated material in the embodiment.

As a preferred implementation, after the laser grating is adjusted, the camera 6 for PIV photography is provided in the embodiment. A mounting position and a mounting angle of the camera 6 are adjusted. This ensures that the test observation region can be captured.

After a hypersonic wind tunnel is opened, a shock wave is generated near a surface of the wind tunnel test section model. A laser grating image photographed by the camera 6 again is the distorted laser grating image. In this case, the camera 6 is configured to acquire the distorted laser grating image when the working condition of the wind tunnel test section model is adjusted to the working condition of the PIV test.

Before the hypersonic wind tunnel is opened, the camera 6 is configured to acquire a non-distorted laser grating image, so as to perform subsequent neural network training.

Further, the camera 6 in the embodiment is a double-exposure charge coupled device (CCD) camera. The camera 6 is controlled by software to photograph the laser grating before and after the operation of the wind tunnel. Camera data is transmitted to the background processor through a high-speed Cameralink data line for storage.

Further, the wind tunnel in the embodiment is configured to generate a uniform and stable high-speed airflow. The test model is provided in a test section preliminarily. Tracer particles 2 are distributed in the test section to achieve a better display effect of the laser grating on the image.

As a preferred implementation, after the laser grating images before and after the distortion are recorded, the neural network-based distortion-restoring calibration algorithm is proposed in the embodiment. Thus, the distorted laser grating image caused by the shock wave can be calibrated and corrected.

Corner detection is performed on the two laser grating images to extract corresponding 2D corner coordinate information. Since the whole spatial positions are unchanged, corner coordinates of the two laser grating images are in one-to-one correspondence.

A three-layer neural network structure is constructed, with an input being the 2D corner coordinate information extracted on the distorted laser grating image, and an output being the 2D corner coordinate information extracted on the non-distorted laser grating image. Data of the extracted 2D corner coordinate information is divided into a training set and a verification set. The neural network structure is trained with a suitable training strategy until an accuracy of fitting, thereby obtaining a desired neural network model. In this way, distortion information of the whole image is implied in the neural network model.

Each point coordinate on the distorted laser grating image is input to the neural network model to output a true image coordinate after the distortion is restored. Therefore, the distorted laser grating image is calibrated and the distortion is restored.

Compared with a conventional physical target method, the laser grating has no impact on the true flow field and can record the true distorted image caused by the shock wave in the embodiment.

Embodiment 2

Referring to FIG. 2, the embodiment provides a method for calibrating a PIV image based on laser linear arrays. The method is applied to the device for calibrating a PIV image based on laser linear arrays in Embodiment 1, and includes the following steps:

Step 201: The distorted laser grating image when the working condition of the wind tunnel test section model is adjusted to the working condition of the PIV test is acquired. The laser grating is a grating formed in the test observation region after the light splitting is performed on the laser rays in the laser linear array light path.

Step 202: The distorted laser grating image is calibrated and restored with the neural network-based distortion-restoring calibration algorithm to obtain the reconstructed laser grating image.

Further, the method for calibrating a PIV image based on laser linear arrays further includes:

The laser emission component is provided.

The laser emission component includes a fixed frame and a plurality of laser pointers. The plurality of laser pointers are parallel arranged on the fixed frame. A distance between any two adjacent ones of the laser pointers is the same. In operation, a mounting angle of the laser emission component and a distance between two adjacent ones of the laser pointers are adjusted, such that all laser rays in the laser linear arrays are parallel and coplanar.

Further, the method for calibrating a PIV image based on laser linear arrays further includes:

A semi-transparent and semi-reflective mirror and a total-reflection mirror are sequentially provided on the laser linear array light path.

In operation, a mounting angle of the semi-transparent and semi-reflective mirror is adjusted, such that after the laser rays pass through the semi-transparent and semi-reflective mirror, one part of the laser rays are transmitted, and the other part of the laser rays are reflected to form first reflected laser rays, and the first reflected laser rays are irradiated onto the test observation region. A mounting angle of the total-reflection mirror is adjusted, such that transmitted laser rays are totally reflected by the total-reflection mirror to form second reflected laser rays, and the second reflected laser rays are irradiated onto the test observation region. The first reflected laser rays and the second reflected laser rays are crossed in the test observation region to form a staggered laser grating.

Further, Step 202 specifically includes:

2D corner coordinate information of the laser grating on the distorted laser grating image is extracted with a corner detection algorithm.

Non-distorted 2D corner coordinate information is determined based on a neutral network model and the 2D corner coordinate information of the laser grating on the distorted laser grating image.

The reconstructed laser grating image is obtained based on the non-distorted 2D corner coordinate information.

Embodiment 3

Figure 3:
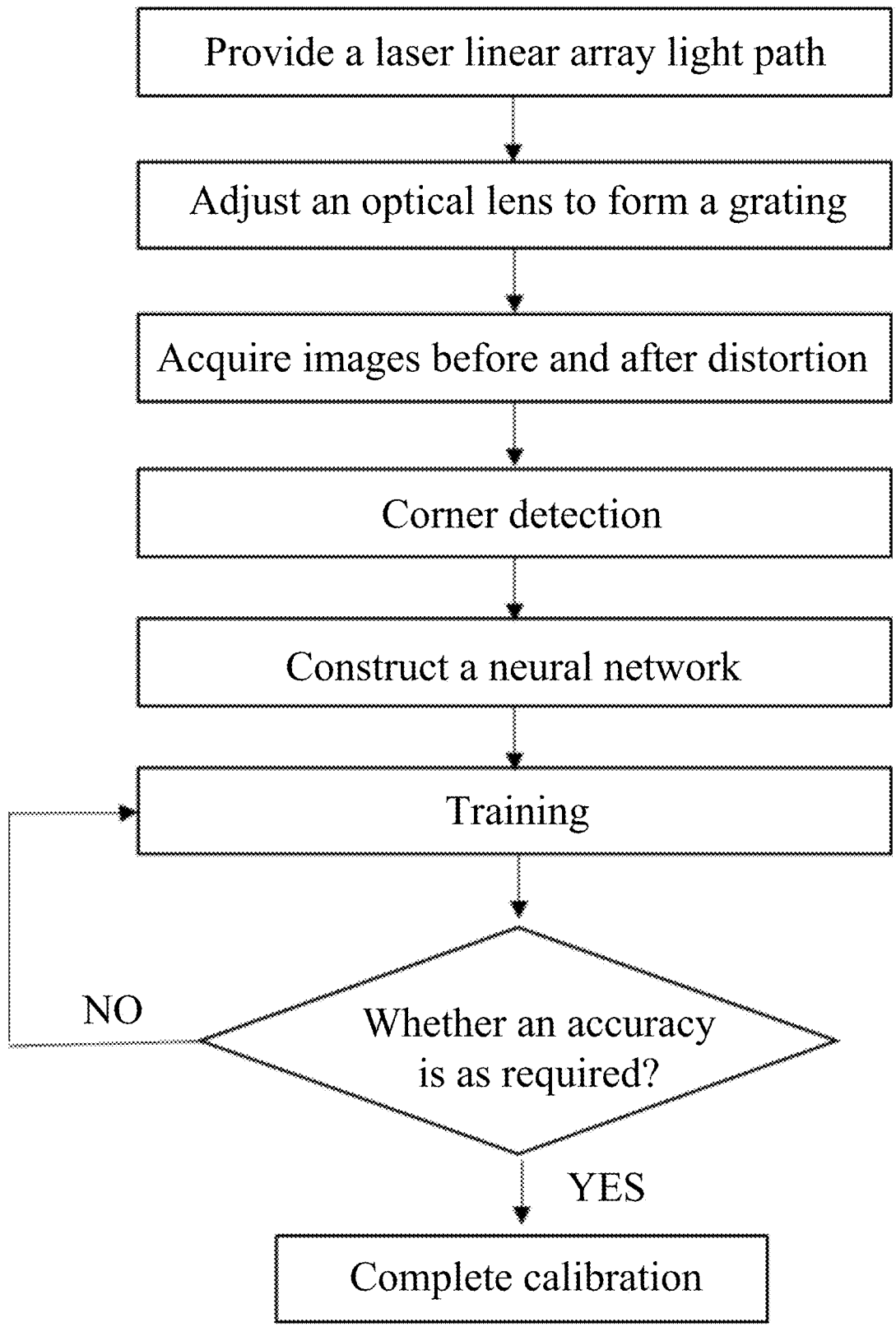
FIG. 3 is a flow chart of a method for calibrating an image distortion based on laser linear arrays and a neural network according to the present disclosure.

As shown in FIG. 3, the embodiment provides a method for calibrating an image distortion based on laser linear arrays and a neural network, including the following steps:

Step 1: A laser linear array light path is provided, specifically:

A plurality of laser pointers are provided on a fixed frame. A mounting spacing and a mounting angle of each of the laser pointers are adjusted, such that the laser pointers emit coplanar and parallel laser linear arrays to form the laser linear array light path.

Step 2: An optical lens is adjusted to form a grating, specifically:

Step 2.1: A semi-transparent and semi-reflective mirror is provided on the laser linear array light path. The semi-transparent and semi-reflective mirror is located above a wind tunnel test section model. The semi-transparent and semi-reflective mirror is configured to directly transmit one part of laser rays in the laser linear arrays, and reflect one part of laser rays in the laser linear arrays. A mounting position and a mounting angle of the semi-transparent and semi-reflective mirror are adjusted, such that reflected light rays illuminate a test observation region, namely a flow observation region.

Step 2.2: A total-reflection mirror is provided on a light path of transmitted light rays. The total-reflection mirror is located above the wind tunnel test section model. The total-reflection mirror is configured to totally reflect the transmitted light rays. A mounting position and a mounting angle of the total-reflection mirror are adjusted, such that reflected light rays also illuminate the test observation region, and are crossed with the reflected light rays of the semi-transparent and semi-reflective mirror to form the laser grating.

Step 3: Images before and after distortion are acquired, specifically:

Step 3.1: A camera is provided on a test bench. A mounting position and a mounting angle of the camera are adjusted, such that the camera can accurately capture the test observation region.

Step 3.2: Tracer particles are provided in a test section of a wind tunnel to achieve a better reflection effect of the laser grating.

Step 3.3: Before the wind tunnel is opened, the camera is used to record a laser grating image. By this time, the laser grating on the laser grating image is not distorted.

Step 3.4: The hypersonic wind tunnel is opened, and a working condition in the test section of the wind tunnel is adjusted to a working condition of a PIV test. By this time, a shock wave is generated on a surface of the wind tunnel test section model, the laser grating is distorted, and the camera is used to record a distorted laser grating image after distortion.

Step 4: Corner detection is performed, specifically:

2D corner coordinate information of the laser grating on the non-distorted laser grating image and 2D corner coordinate information of the laser grating on the distorted laser grating image are extracted with a corner detection algorithm.

The corner detection algorithm is as follows:

A window with a preset size is used to move in each direction of the laser grating image, and a self-correlation function on a grayscale change in the window in movement is calculated by Eq. (1):

$$E(u, v) = \sum_{x,y} w(x, y)[I(x+u, y+v) - I(x, y)]^2 \quad (1)$$

Where, (u,v) is the size of the window, w is a weight of the window and is 1, I is a pixel grayscale value of the image, and (x,y) is a pixel coordinate.

Through Taylor expansion, the self-correlation function E can be written as:

$$E(u, v) = [u, v]M\begin{bmatrix}u\\v\end{bmatrix}^2 \quad (2)$$

M is calculated by:

$$M = \sum_{x,y} w(x, y)\begin{bmatrix}I_x^2 & I_xI_y\\I_xI_y & I_y^2\end{bmatrix} \quad (3)$$

A corresponding function R of a corner is defined as:

$$R = detM - k(traceM)^2 \quad (4)$$

$$traceM = \lambda_1 + \lambda_2 \quad (5)$$

$$detM = \lambda_1\lambda_2 \quad (6)$$

Where, traceM is a trace of a matrix M, detM is a rank of the matrix M, $\lambda_1$ and $\lambda_2$ are an eigenvalue of the matrix M, and k is an empirical constant, and is 0.04-0.06.

When it is detected that R is greater than 0, a corner position is located and 2D corner coordinate information is extracted.

Step 5: A neural network is constructed.

Figure 4:
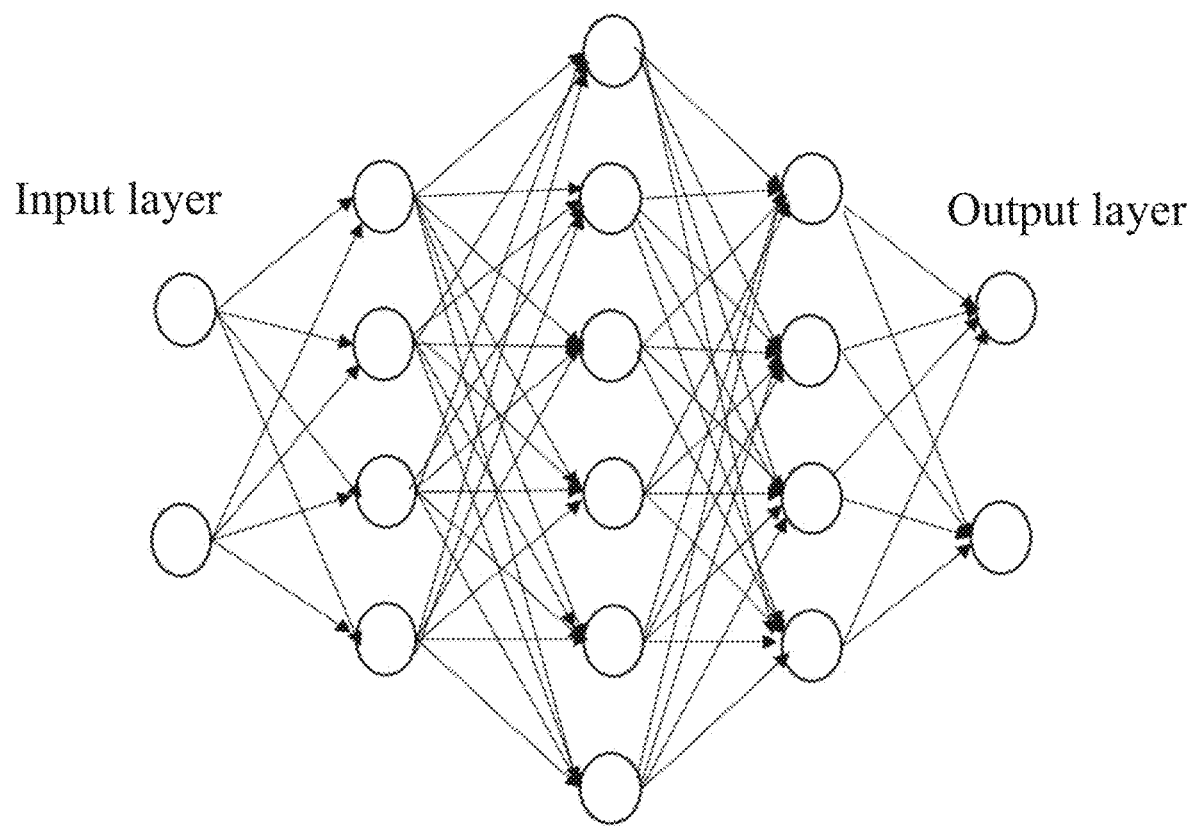
FIG. 4 is a schematic view of a neural network according to the present disclosure.

Referring to FIG. 4, the neural network includes two hidden layers. An ReLU activation layer is added after each neuron. The neuron is mathematically expressed as:

$$f(x) = \max\left(0, \sum_{i}^{n} w_i x_i + b\right) \quad (7)$$

A loss of the neural network is calculated with an MSE function. That is, a loss function of the neural network is given by:

$$Loss = \frac{1}{n}\sum_{i=1}^{n}\left((x-x')^2 + (y-y')^2\right) \quad (8)$$

Where, (x,y) is a predicted coordinate output by the neural network, (x', y') is a true coordinate output by the neural network, namely the non-distorted 2D corner coordinate determined with the corner detection algorithm, and n is a number of batches in training.

Step 6: A neural network model is obtained by training. The distorted 2D corner coordinate information serves as an input of the neural network model, and the non-distorted 2D corner coordinate information serves as an output of the neural network model.

The non-distorted 2D corner coordinate information and the distorted 2D corner coordinate information form samples in the training set. Eight samples form one group to train a weight of the neural network in one batch.

An Adam optimization learning algorithm is selected for optimized training of the neural network. The optimized training is as follows:

Step 6.1: The weight in the neural network is initialized as $\theta_0$, a first-order moment matrix $m_0$ and a second-order moment matrix $v_0$ are initialized, a learning rate $\alpha=0.00001$, parameter weights $\beta_1=0.9$, $\beta_2=0.999$, and $\varepsilon=10^{-8}$.

Step 6.2: Under the present weight, samples in one batch are brought to calculate an output loss $Loss_t(\theta_{t-1})$ of the neural network, and a gradient on the weight $\theta$ is calculated by:

$$g_1 = \nabla_\theta Loss_t(\theta_{t-1}) \quad (9)$$

Where t represents a number of present iteration times, and t−1 is a number of previous iteration times.

Step 6.3: A biased first-order moment matrix and a biased second-order moment matrix are calculated by:

$$m_t = \beta_1 \times m_{t-1} + (1-\beta_1)g_t \quad (10)$$

$$v_t = \beta_2 \times v_{t-1} + (1-\beta_2)g_t^2 \quad (11)$$

Step 6.4: An unbiased first-order moment matrix and an unbiased second-order moment matrix are calculated by:

$$\widehat{m_t} = m_t/(1-\beta_1^t) \quad (12)$$

$$\hat{v}_t = v_t/(1-\beta_2^t) \quad (13)$$

Step 6.5: The weight of the neural network is calculated and updated by:

$$\theta_t = \theta_{t-1} - \alpha \cdot \widehat{m_t}/(\sqrt{\hat{v}_t} + \epsilon). \quad (14)$$

Step 6.6: Step 6.2 to Step 6.5 are repeated, until the loss is no longer reduced, thereby completing the training.

Step 6.7: Unused 2D corner coordinate information is used as a verification set to verify an accuracy of the neural network model in prediction. When the accuracy is 90% or more, the neural network model is as required.

Step 7: Calibration is completed, and image distortion is restored.

Figure 5A:
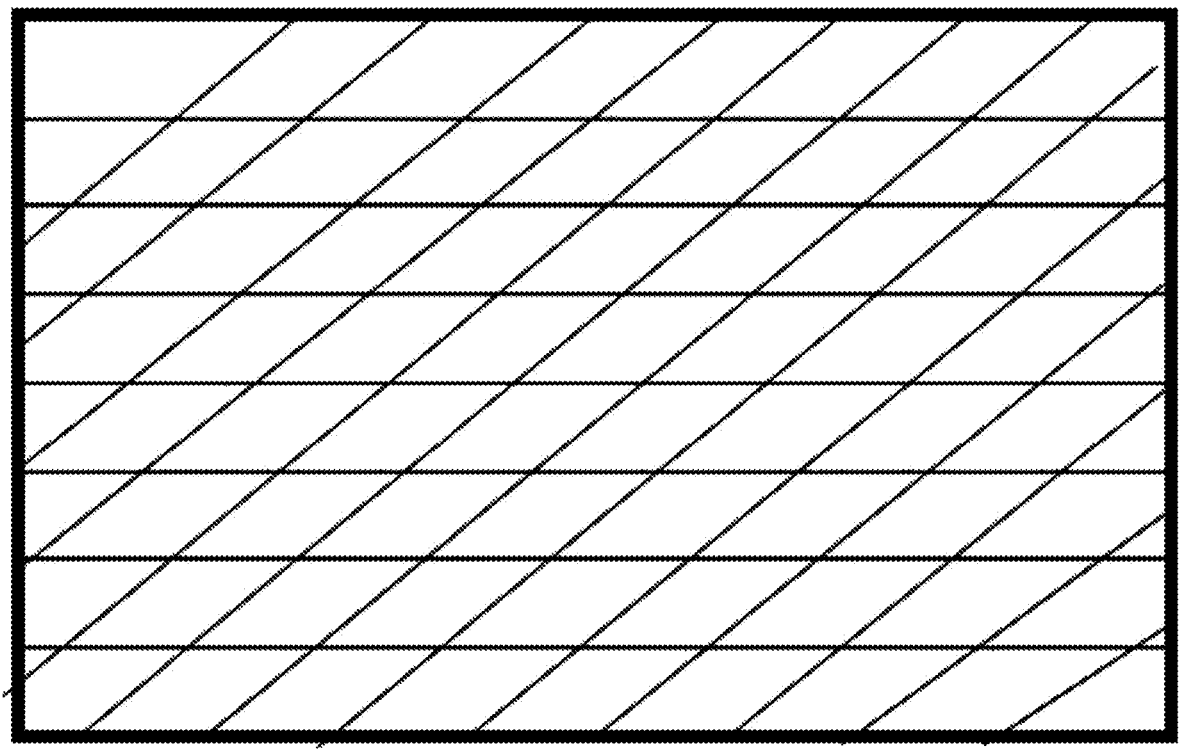
FIG. 5(a) illustrates a non-distorted laser grating image.
Figure 5B:
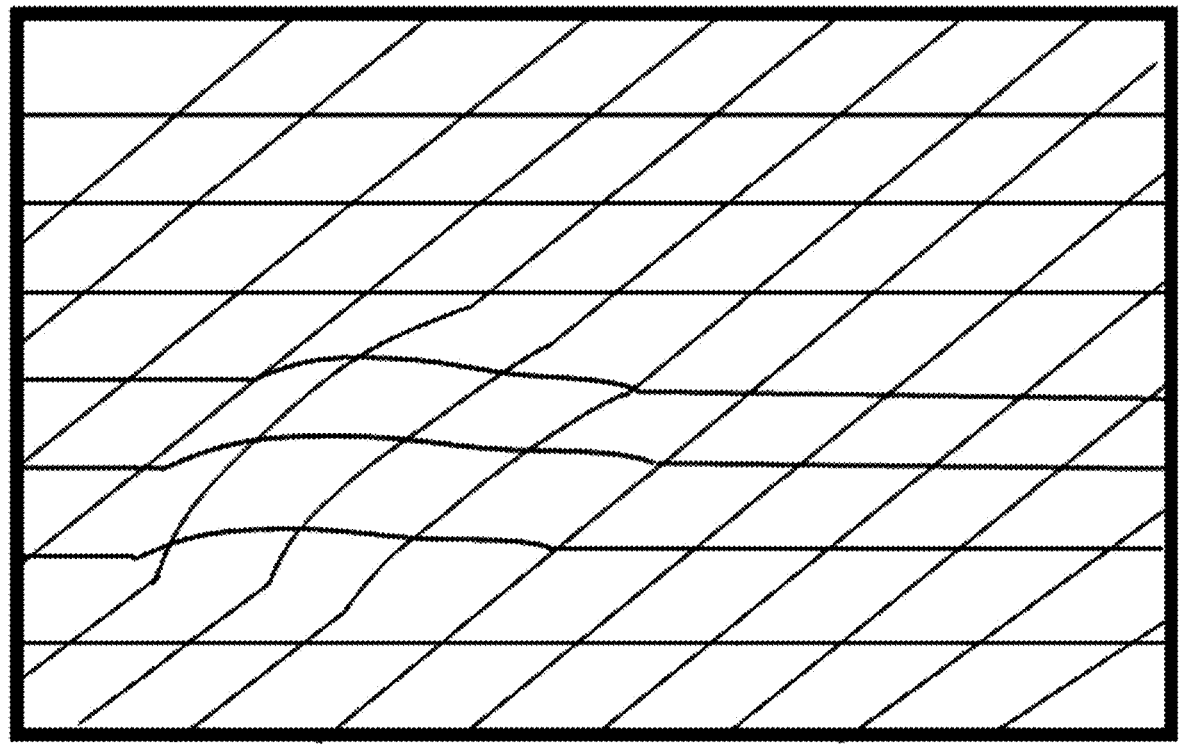
FIG. 5(b) illustrates a distorted laser grating image.
Figure 5C:
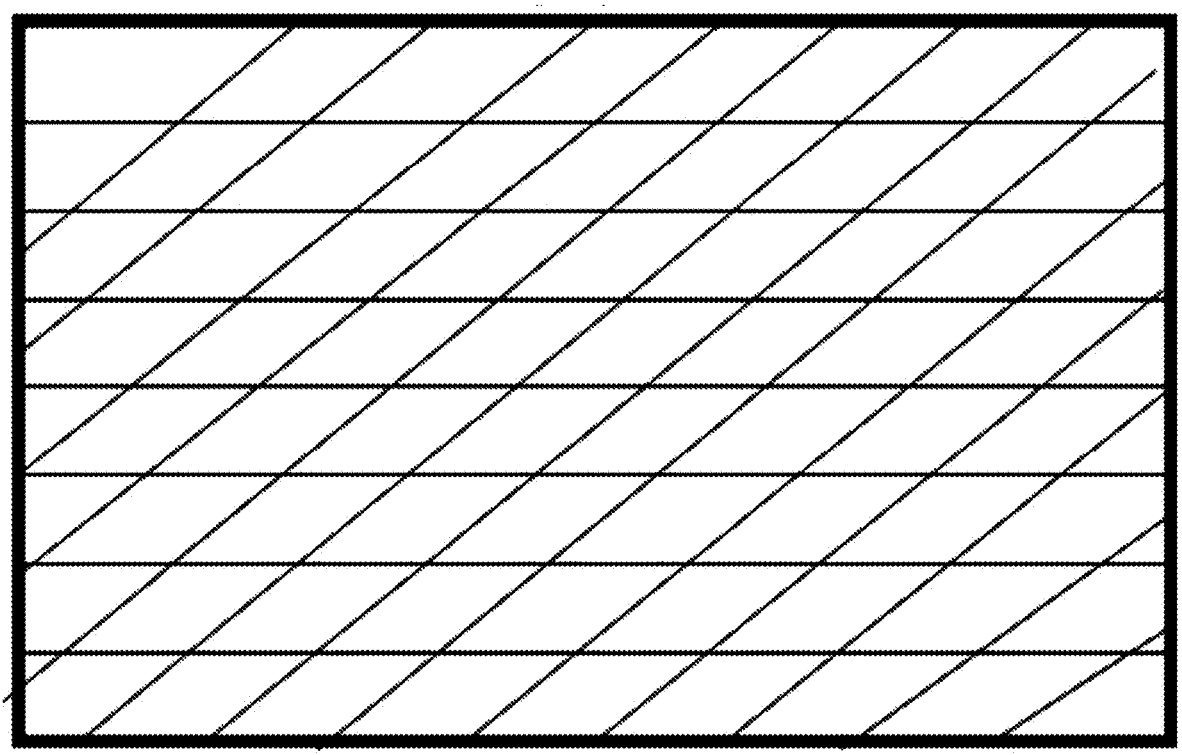
FIG. 5(c) illustrates a distortion restored laser grating image.

After the neural network model including distortion information is obtained, each pixel (x,y,I) on the distorted laser grating image is extracted, I being grayscale information of the pixel. The coordinate (x,y) is input to the neural network model including the distortion information, thereby predicting a coordinate (x',y') on the non-distorted laser grating image. All pixels (x,y,I) on the distorted laser grating image are traversed to reconstruct the corresponding non-distorted laser grating image, with an effect shown in FIGS. 5A-C.

The present disclosure provides a device and method for calibrating a PIV image based on laser linear arrays. The device includes a laser emission component for emitting a series of equidistant laser linear arrays. A plurality of optical lens are provided on a laser linear array light path to reflect and transmit laser rays, namely realize light splitting on the laser linear arrays. A mounting position and a mounting angle of each of the optical lens are adjusted reasonably to form a laser grating with vertically crossed laser linear arrays near a wind tunnel test section model. A camera is provided outside an observation window of the wind tunnel test section model, and configured to capture a high-definition image of the laser grating.

In operation of a wind tunnel, under an action of a high-speed airflow, a shock wave is generated near a test observation region of the wind tunnel test section model, and thus projection of grids of a local laser grating on the image is distorted to form a distorted image.

Two high-definition images of the laser grating before and after the operation of the wind tunnel are recorded, the two recorded images before and after the operation of the wind tunnel are detected with a corner detection algorithm, all recognized coordinates at intersections of grids of the laser grating are extracted, and a neural network model is constructed based on the recognized coordinates. By taking a distorted corner coordinate as an input, and a corresponding non-distorted corner coordinate as a true output value for model training, the neural network model is constructed. A distorted image acquired by the camera is input to the neural network model to calibrate a PIV image.

The device and method provide a calibration solution without a physical target, and solve the problem of image distortion caused by a shock wave near a model in PIV measurement of the hypersonic wind tunnel. With the neural network model for fitting the distortion, the present disclosure improves an accuracy of distortion correction.

Each embodiment in the description is described in a progressive mode, each embodiment focuses on differences from other embodiments, and references can be made to each other for the same and similar parts between embodiments. Since the system disclosed in an embodiment corresponds to the method disclosed in an embodiment, the description is relatively simple, and for related contents, references can be made to the description of the method.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed is:

1. A device for calibrating a particle image velocimetry (PIV) image based on laser linear arrays, comprising:
   a laser emission component configured to emit equidistant laser linear arrays to form a laser linear array light path;
   an optical component configured to perform light splitting on laser rays in the laser linear array light path to form a laser grating in a test observation region;
   a camera configured to acquire a distorted laser grating image when a working condition of a wind tunnel test section model is adjusted to a working condition of a PIV test, the test observation region being located above the wind tunnel test section model; and
   a background processor configured to calibrate and restore the distorted laser grating image with a neural network-based distortion-restoring calibration algorithm to obtain a reconstructed laser grating image.

2. The device for calibrating a PIV image based on laser linear arrays according to claim 1, wherein the laser emission component comprises a fixed frame and a plurality of laser pointers;
   the plurality of laser pointers are parallel arranged on the fixed frame, and a distance between any two adjacent ones of the laser pointers is the same; and
   in operation, a mounting angle of the laser emission component and a distance between two adjacent ones of the laser pointers are adjusted, such that all laser rays in the laser linear arrays are parallel and coplanar.

3. The device for calibrating a PIV image based on laser linear arrays according to claim 1, wherein
   the optical component comprises a semi-transparent and semi-reflective mirror and a total-reflection mirror sequentially arranged on the laser linear array light path;
   in operation, a mounting angle of the semi-transparent and semi-reflective mirror is adjusted, such that after the laser rays pass through the semi-transparent and semi-reflective mirror, one part of the laser rays are transmitted, and the other part of the laser rays are reflected to form first reflected laser rays, and the first reflected laser rays are irradiated onto the test observation region;
   a mounting angle of the total-reflection mirror is adjusted, such that transmitted laser rays are totally reflected by the total-reflection mirror to form second reflected laser rays, and the second reflected laser rays are irradiated onto the test observation region; and
   the first reflected laser rays and the second reflected laser rays are crossed in the test observation region to form a staggered laser grating.

4. The device for calibrating a PIV image based on laser linear arrays according to claim 1, wherein
   after a hypersonic wind tunnel is opened, the camera is configured to acquire the distorted laser grating image when the working condition of the wind tunnel test section model is adjusted to the working condition of the PIV test; and
   before the hypersonic wind tunnel is opened, the camera is configured to acquire a non-distorted laser grating image.

5. The device for calibrating a PIV image based on laser linear arrays according to claim 1, wherein the background processor specifically comprises:
   a distorted two-dimensional (2D) corner coordinate information extraction module configured to extract 2D corner coordinate information of the laser grating on the distorted laser grating image with a corner detection algorithm;
   a non-distorted 2D corner coordinate information determination module configured to determine non-distorted 2D corner coordinate information based on a neutral network model and the 2D corner coordinate information of the laser grating on the distorted laser grating image; and
   a reconstruction module configured to obtain the reconstructed laser grating image based on the non-distorted 2D corner coordinate information.

6. The device for calibrating a PIV image based on laser linear arrays according to claim 5, wherein
   the neutral network model is a three-layer neutral network model; a mean square error (MSE) function serves as a loss function of the neutral network model;
   the neutral network model comprises two hidden layers; and a rectified linear unit (ReLU) activation layer is added after each neuron; and
   the 2D corner coordinate information of the laser grating on the distorted laser grating image serves as an input of the neutral network model, and the corresponding non-distorted 2D corner coordinate information serves as an output of the neutral network model.

7. A calibration method applied to the device for calibrating a particle image velocimetry (PIV) image based on laser linear arrays comprising:
   acquiring a distorted laser grating image when a working condition of the wind tunnel test section model is adjusted to a working condition of a PIV test, the wind tunnel test section model having thereabove a test observation region in which a laser grating is formed after light splitting is performed on laser rays in a laser linear array light path; and
   calibrating and restoring the distorted laser grating image with a neural network-based distortion-restoring calibration algorithm to obtain a reconstructed laser grating image.

8. The calibration method according to claim 7, further comprising:
providing the laser emission component, wherein
the laser emission component comprises a fixed frame and a plurality of laser pointers; the plurality of laser pointers are parallel arranged on the fixed frame, and a distance between any two adjacent ones of the laser pointers is the same; and
in operation, a mounting angle of the laser emission component and a distance between two adjacent ones of the laser pointers are adjusted, such that all laser rays in the laser linear arrays are parallel and coplanar.

9. The calibration method according to claim 7, further comprising:
sequentially providing a semi-transparent and semi-reflective mirror and a total-reflection mirror on the laser linear array light path, wherein in operation,
a mounting angle of the semi-transparent and semi-reflective mirror is adjusted, such that after the laser rays pass through the semi-transparent and semi-reflective mirror, one part of the laser rays are transmitted, and the other part of the laser rays are reflected to form first reflected laser rays, and the first reflected laser rays are irradiated onto the test observation region;
a mounting angle of the total-reflection mirror is adjusted, such that transmitted laser rays are totally reflected by the total-reflection mirror to form second reflected laser rays, and the second reflected laser rays are irradiated onto the test observation region; and
the first reflected laser rays and the second reflected laser rays are crossed in the test observation region to form a staggered laser grating.

10. The calibration method according to claim 7, wherein the calibrating and restoring the distorted laser grating image with the neural network-based distortion-restoring calibration algorithm to obtain the reconstructed laser grating image specifically comprises:
extracting two-dimensional (2D) corner coordinate information of the laser grating on the distorted laser grating image with a corner detection algorithm;
determining non-distorted 2D corner coordinate information based on a neutral network model and the 2D corner coordinate information of the laser grating on the distorted laser grating image; and
obtaining the reconstructed laser grating image based on the non-distorted 2D corner coordinate information.

\* \* \* \* \*